United States Patent Office 2,768,000
Patented Oct. 23, 1956

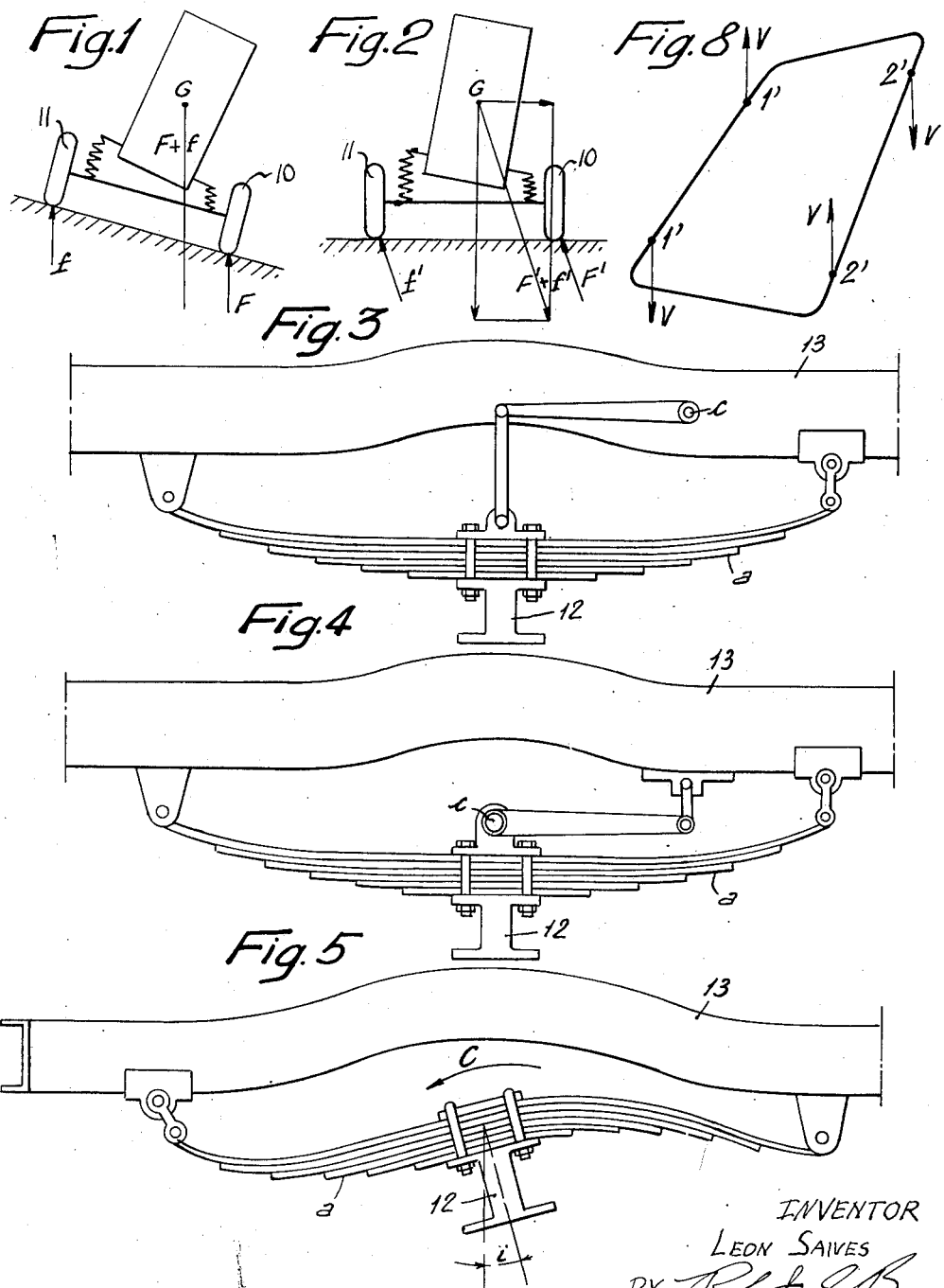

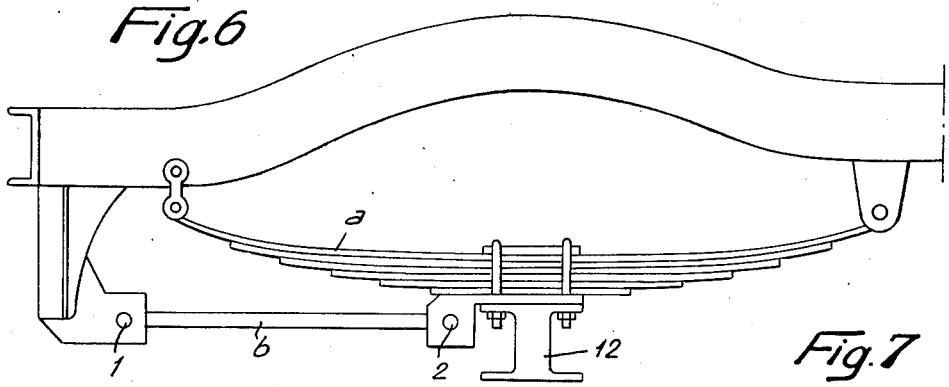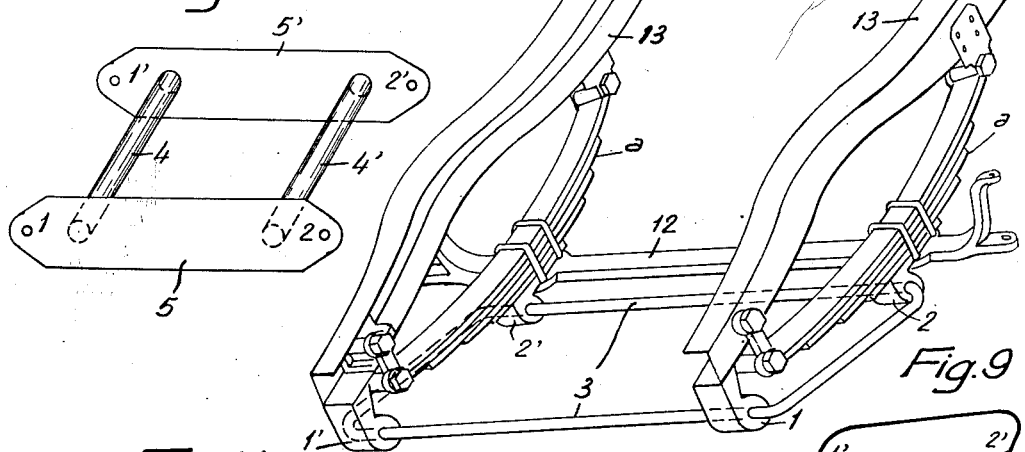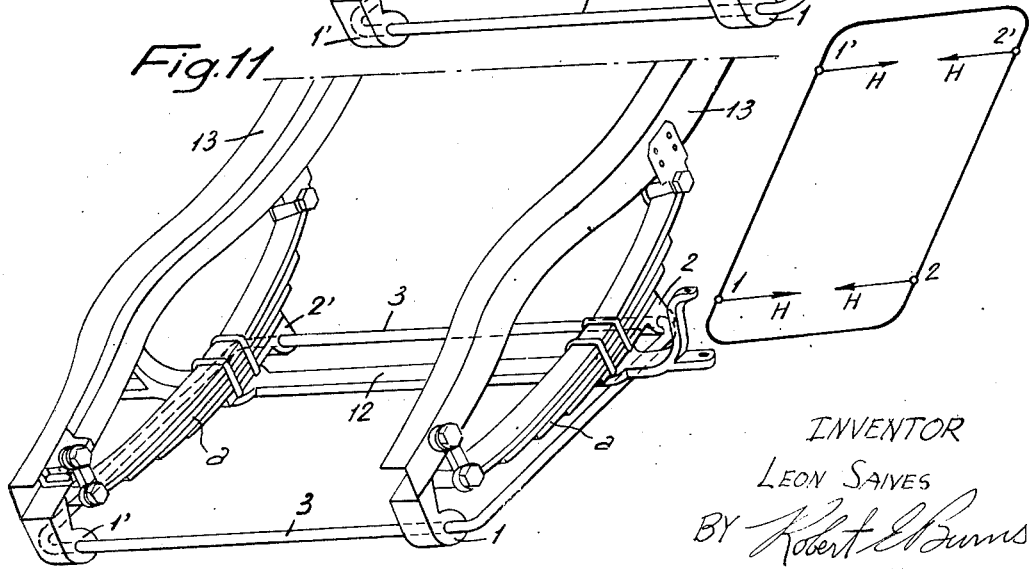

2,768,000
SPRING SUSPENSION HAVING A CONTINUOUS DISTORTION FRAME STABILIZER

Leon Saives, Billancourt, France, assignor to Regie Nationale des Usines Renault, Billancourt, France Application July 17, 1953, Serial No. 368,756

Claims priority, application France July 23, 1952

5 Claims. (Cl. 280—124)

The invention relates to the suspension of vehicles, and relates more particularly to improvements enabling the suspension of motor vehicles to be improved by reducing, by simple means, the lateral inclination of the vehicle, either on roads with a lateral slope, or at corners.

According to the invention, these improvements consist essentially in mounting between the chassis and the axle or axles a frame which can be distorted, hereinafter referred to as a "distortion frame," which acts as the devices known as torsion bars and reaction rods.

Several specific embodiments of a distortion frame shock absorber for a vehicle suspension in accordance with the invention will be hereinafter described by way of example with reference to the accompanying drawings, in which:

Figures 1 and 2 are diagrammatic views of the effects produced in the suspensions currently in use by the slope of the road or curves;

Figures 3 and 4 show the mounting of torsion bars generally used to combat the lateral inclination of car bodies;

Figures 5 and 6 are explanatory drawings showing the behaviour of suspensions when the brakes are applied;

Figures 7, 8 and 9 show a distortion frame shock-absorber in accordance with the invention, respectively in position on the chassis, as distorted by the movement of the suspension, and when the brakes are applied; and Figures 10 and 11 show further embodiments of the invention.

It is known that when a vehicle rests on ground having a lateral slope, the load on the lower wheel 10 is greater than the load on the higher wheel 11, as illustrated in the figures, in which 12 indicates the axle, 13 the chassis, $a$ and $a$ the suspension springs, G the center of gravity, F and $f$ the ground reaction on the wheels.

It is also known that when a vehicle is subjected to its own weight and centrifugal force, the load and therefore the ground reaction F′ on the off-side wheel 10 is greater than the load and therefore the ground reaction $f'$ on the near-side wheel 11, as illustrated in Figure 2.

In both cases, the spring situated on the side which receives the greater load is compressed more than the other. The vehicle therefore inclines towards the side where there is the greater load, and the more flexible the springs, the greater is the inclination.

It is also known that in order to reduce the lateral inclination of the vehicle it is possible to use a torsion bar $c$, which may be rigidly secured to the chassis 13 (as in Figure 3) or to the axle 12 (as in Figure 4).

When the brakes are applied to the wheels on a front axle, a couple C is developed and gives the springs an S-shape (Figure 5), the direction of translation being indicated by the arrow. As a result, an inclination $i$ of the axle takes place, which reduces the castor action and endangers the stability of the vehicle on the road. A known device for overcoming this disadvantage is the reaction rod. This device utilizes the pull in the reaction rod $b$ (Figure 6) and the compression in the main leaf of the spring $a$ to constitute a couple which counterbalances the braking couple C.

On the other hand, it is known that leaf springs are generally lacking in lateral rigidity and permit a certain lateral displacement of the vehicle which impairs its stability.

Figure 7 shows an example of a suspension shock absorber device according to the invention. A continuous frame 3 is fixed to the chassis at the points 1 and 1′, and to the front axle at points 2 and 2′, $a$ being the usual semi-elliptic suspension springs. When the front axle inclines in relation to the chassis, the frame 3 is distorted as shown in Figure 8. It then causes at the points 1, 1′, 2, 2′ four equal forces V, which act in the directions indicated by the arrows in the figure and tend to straighten out the chassis. When the front axle is braked, the frame 3 acts on the chassis at the points 1, 1′, 2, 2′ with four equal forces H as shown in Figure 9 which tend to prevent the reduction in the castor action of the axle. It is obvious that the distortions in the Figures 8 and 9 may be produced simultaneously. As the stress of the metal is distributed over the entire frame 3, the proportion of stress is generally less than in a conventional torsion bar. A metal of lower tensile strength can therefore be used, and less care need be taken in machining than for a torsion bar. As the frame may be subject to both torsional and flexional stress, it is necessary for the connections 1, 1′, 2, 2′ to be adjustable. Accordingly the joint is an adjustable resilient joint of rubber or some similar material and is of the type known as "Silientbloc" in the trade.

Figure 10 shows another embodiment of a device according to the invention. Here the frame consists of cross rods 4 and 4′, corresponding to the long sides of the frame 3, which are torsionally stiff and not very flexible, and of plates 5 and 5′, which are not very flexible and are not torsionally stiff. The plates 5, 5′ are connected on the one hand to the chassis 13, on the other hand to the axle 12 and correspond to the short sides of the frame 3. As a result, the joints 1 and 1′ remain substantially parallel to the chassis, while the joints 2 and 2′ remain substantially parallel to the axle. This arrangement renders unnecessary the resilient joints which were needed for the device shown in Figure 7.

Figure 11 shows a slightly different mounting of the frame, the points 2 and 2′ being carried over to the other side of the axle from the points 1 and 1′ fixed to the chassis.

In each of these cases, it is sufficient to stabilize the points of attachment 1, 1′, 2, 2′ laterally, in relation to the frame, to combat effectively the lack of lateral rigidity in the suspension.

I claim:

1. In a vehicle having a frame, an axle extending transversely of the frame and semi-elliptic springs resiliently mounting the frame on said axle, an improved stabilizing means comprising a continuous distortion frame having longitudinal portions and connecting transverse portions, resilient means connecting said distortion frame to the vehicle frame at opposite points spaced from the axle in a direction longitudinally of the vehicle and resilient means connecting said distortion frame to laterally spaced points on said axle.

2. An improved suspension for a vehicle having a frame and an axle extending transversely of said frame, semi-elliptic springs connecting said axle with said frame, and a continuous distortion frame of generally rectangular shape having longitudinal portions and transverse portions, resilient means connecting said distortion frame to spaced points on said axle and resilient means connecting said distortion frame to the vehicle frame at points near but spaced from the points at which said springs are connected to said vehicle frame.

3. An improved suspension for a vehicle having a frame and an axle extending transversely of said frame, semi-elliptic springs having their ends connected to said frame and intermediate portions connected to said axle, and a continuous distortion frame of generally rectangular shape having opposite longitudinal portions and opposite transverse portions, said longitudinal portions extending approximately parallel to said springs, one of said transverse portions being adjacent and approximately parallel to said axle and the other of said transverse portions being adjacent and extending transversely of said vehicle frame, resilient means connecting said distortion frame at spaced points to said axle and means connecting said distortion frame to said vehicle frame at points spaced from but near the ends of said springs.

4. An improved suspension for a vehicle having a frame and an axle extending transversely of said frame, semi-elliptic springs having their ends connected to said frame and intermediate portions overlying and connected to said axle, and a continuous distortion frame of generally rectangular shape having opposite transverse portions and opposite longitudinal portions, said longitudinal portions extending approximately parallel to said springs, one of said transverse portions being approximately parallel to said axle and resiliently connected to said axle at points adjacent but below said springs and the other of said transverse portions being adjacent and extending transversely of said vehicle frame and being resiliently connected to said vehicle frame at points near but spaced from the ends of said springs.

5. An improved suspension for a vehicle having a frame and an axle extending transversely of the frame, laterally spaced semi-elliptic springs having their ends connected to said frame and intermediate portions connected to said axle and a continuous distortion frame of generally rectangular shape having longitudinal portions approximately parallel to said springs and transverse portions one of which is adjacent and approximately parallel to said axle and the other of which extends transversely of the frame at a distance from said axle, resilient means connecting said distortion frame adjacent two of its corners to said axle and resilient means connecting said distortion frame adjacent the two opposite corners to said vehicle frame.

References Cited in the file of this patent

UNITED STATES PATENTS

| 216,179 | Grier | June 3, 1879 |
| 2,179,016 | Leighton | Nov. 7, 1939 |
| 2,340,857 | Bagnall | Feb. 8, 1944 |
| 2,480,526 | Voltz | Aug. 30, 1949 |